INVENTORS:
RICHARD BINDER
FRANZ-JOSEF VON BOMHARD

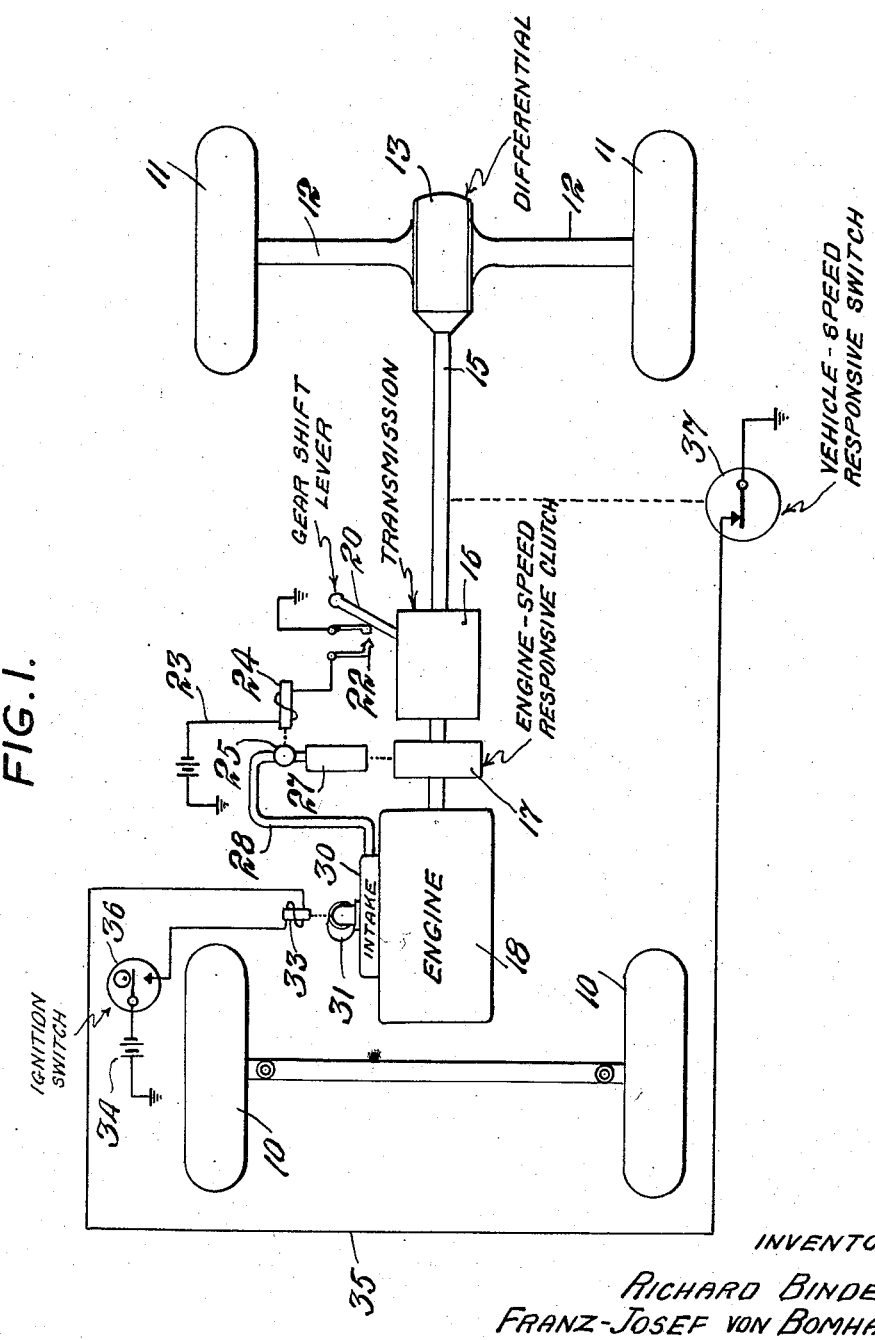

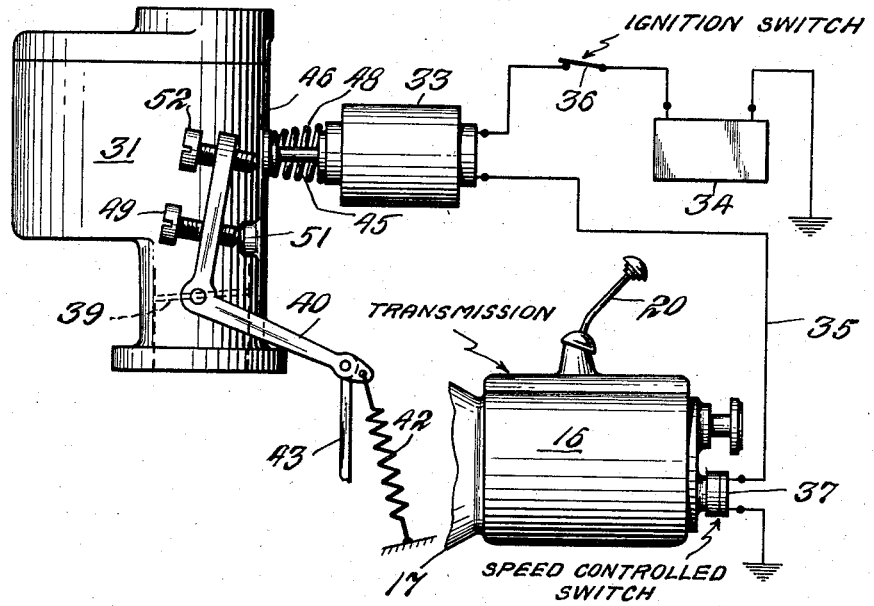
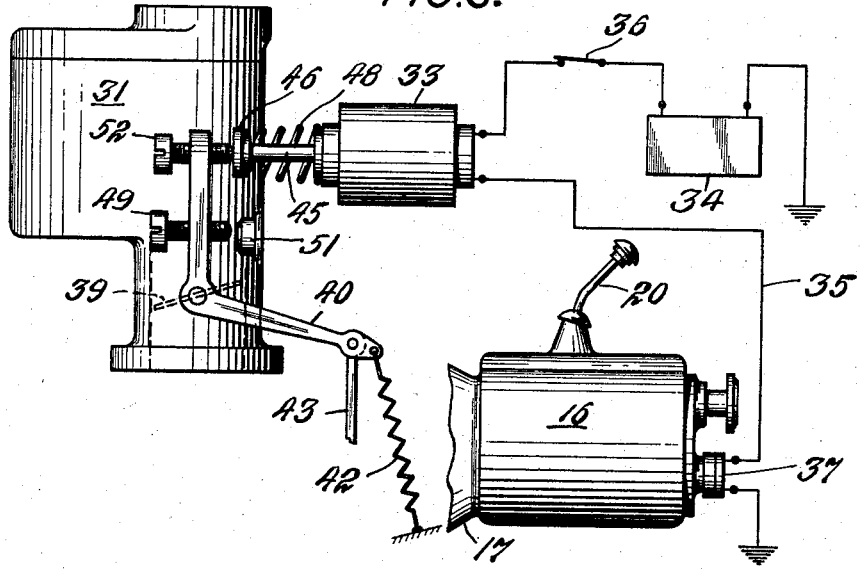

BY
Richardson, David and Nordon
ATTORNEYS.

ated Feb. 9, 1960

United States Patent Office 2,924,313
Patented Feb. 9, 1960

2,924,313

CONTROL APPARATUS FOR VEHICLES EQUIPPED WITH SPEED RESPONSIVE CLUTCHES

Richard Binder, Schweinfurt, and Franz-Josef von Bomhard, Schweinfurt (Main), Germany, assignors to Fichtel & Sachs A.G., Schweinfurt (Main), Germany, a corporation of Germany Application July 30, 1957, Serial No. 675,225

Claims priority, application Germany August 4, 1956

6 Claims. (Cl. 192—.09)

The present invention relates to propulsion systems for automotive vehicles and more particularly to improved apparatus for controlling the operation of a clutch of the type which is automatically engaged and disengaged in accordance with engine speed, the clutch being disengaged whenever the engine speed drops below a predetermined value.

In the type of control system for which the invention is suitable, the engine is connected with the transmission through a clutch which automatically engages when the engine speed is increased from its idling speed, as when the vehicle is standing still, to a minimum running speed for the engine at which speed the engine is able to take over the load involved in propelling the vehicle without danger of stalling. Engine speed responsive clutches of this character are known in the art and may be actuated by centrifugal forces acting on weights, by electromagnetic means controlled by variations in generator voltage or any other arrangement whereby the clutch will always be engaged whenever the engine speed exceeds a predetermined minimum value. Clutches of this character are ordinarily provided with automatic disengaging means controlled by the gear shift lever while changing gears, the disengaging means being power operated or otherwise arranged to disengage the clutch while the engine speed is higher than the predetermined minimum speed and the clutch would otherwise remain engaged.

The invention comprises means for increasing the idling speed of the engine above its normal idling speed so that the clutch cannot be disengaged except during gear shifting while the speed of the vehicle is higher than a certain predetermined minimum value. In other words, the engine speed controlled means for engaging and disengaging the clutch is effectively locked out while the vehicle is traveling at any speed higher than a very slow speed.

By locking out the engine speed control for the clutch, the drag of the engine is always available for braking purposes. For descending steep grades, a low speed gear ratio may be used without danger of the clutch failing to become reengaged after the gear shifting disengagement interval. Furthermore, while the engine speed responsive clutch control is thus locked out, there is no possibility of sudden engagement and disengagement of the clutch by changes in engine speed while the vehicle is traveling at normal driving speeds. This sudden engagement and disengagement may occur if the engine speed should be permitted to drop to its idling speed while shifting gears with the vehicle traveling at normal driving speed.

With the clutch temporarily disengaged during movement of the gear shift lever, and with the accelerator in its idling position, the engine speed can quickly drop to its idling value while the clutch is thus disengaged. In the meantime the vehicle coasts at normal driving speed. When the engine speed is again increased, as soon as the engine speed responsive mechanism reengages the clutch, the engine is abruptly connected to a fast moving load so that the engine drag and inertia of the engine, combined with the inertia of the moving vehicle, produce a sudden change in traction at the wheels. This sudden jolt can be unpleasant and may be very dangerous when driving on slippery road surfaces. The lock out feature of the present invention prevents this possibility.

The invention provides a vehicle speed responsive switch which is actuated at all times when the vehicle speeds exceeds a predetermined slow speed. When the vehicle speed switch is actuated, a different idling adjustment is electromagnetically established at the carburetor so that minimum no load speed of the engine is maintained higher than the engine speed at which the clutch can become disengaged. The engine speed responsive control of the clutch is thus locked out whenever the vehicle is moving at normal driving speeds. While the vehicle is stopped, is moving very slowly, or is accelerating to normal driving speed, the engine speed responsive control of the clutch is fully effective. As noted above, however, the engine speed responsive control of the clutch becomes locked out as soon as the vehicle attains a predetermined minimum driving speed and remains locked out for higher vehicle speeds.

A principal object of the invention is the prevention of jolts or mechanical shocks arising from engine speed controlled engagement and disengagement of the clutch while the vehicle is moving at normal driving speeds.

Another object of the invention is to assure positive engagement of the clutch so that the drag of the engine is continuously available for auxiliary braking effects while the vehicle is descending long steep grades, for example.

Still another object of the invention is the provision of a carburetor, suitable for use in the novel propulsion system, the carburetor including electrically actuable means for shifting from a low idling speed to a higher idling speed for the engine.

A further object of the invention is the provision of brake pedal actuated means for rendering the lower idling speed effective whenever the foot brake is applied so that the full drag of the engine is available for supplementary braking action regardless of the vehicle speed.

Other objects, features and advantages of the invention will become apparent upon reading the following specification together with the accompanying drawing forming a part hereof.

Referring to the drawing.

Figure 1 is a diagrammatic representation of the propulsion system for a vehicle illustrating an embodiment of the invention.

Figure 2 is an enlarged diagrammatic view of the idling speed changing apparatus in its normal or low speed conditions, as with the vehicle stopped and with the carburetor positioned for low idling speed so that fuel consumption is at its minimum value.

Figure 3 is similar to Fig. 1, with the parts shown in their respective positions for normal driving speeds of the vehicle, whereby the engine speed responsive control of the clutch is locked out, the carburetor being positioned for the higher idling speed.

Figure 4:
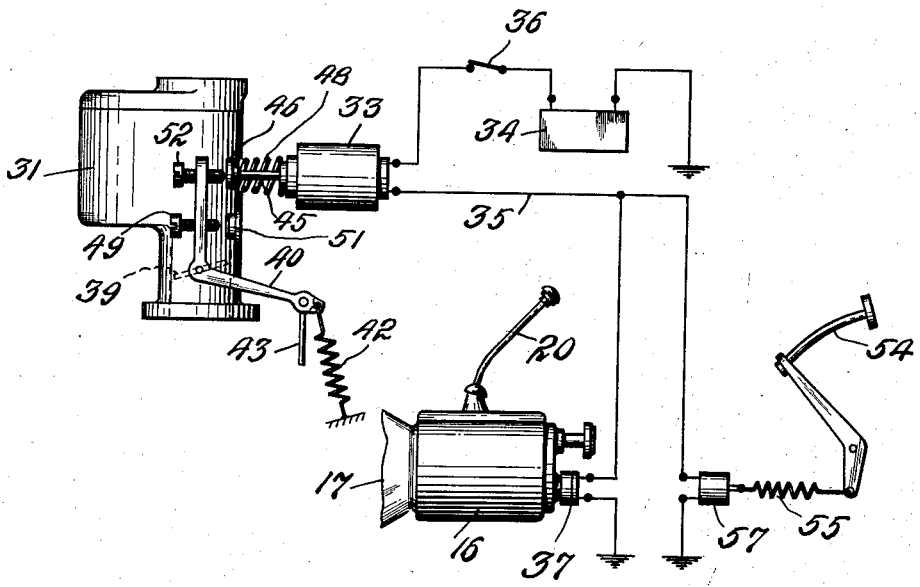
Figure 4 is a view similar to Fig. 3, showing a modified form of the invention wherein the lockout feature is additionally controlled by operation of the vehicle brake pedal.

Referring to Fig. 1, there is a diagrammatic showing of a vehicle having front wheels 10 and rear wheels 11. The vehicle body and the usual steering mechanism for the front wheels 10 have been omitted from the drawing for simplicity of illustration, together with all other portions of the vehicle not relevant to the invention. The rear wheels 11 are connected through rear axle sections 12 and a differential 13 to a drive shaft 15. The drive shaft 15 is connected through a transmission 16 and a clutch 17 to an internal combustion engine 18.

The transmission 16 is provided with a manually operable lever 20 for shifting gears. Operatively associated with the gear shift lever 20 is a pair of electrical switch contacts 22. The contacts 22 are normally open and are closed during manipulation of the gear shift lever 20 to change gears. Whenever the gear shift lever 20 is displaced from its neutral position or from any gear ratio selecting position, the contacts 22 close and remain closed until the lever 20 has reached its final gear selecting position or neutral, as the case may be. Switches for this purpose are known in the art and any desired form of construction may be used.

The contacts 22 control an energizing circuit 23 for the operating winding 24 of a solenoid valve 25. A suction operated cylinder 27 is connected through the solenoid valve 25 and a suction line 28 to the intake manifold 30 of the engine 18. When the gear shift lever actuated contacts 22 are closed, the suction line 28 from manifold 30 is connected to the cylinder 27. The cylinder 27 is shown mechanically connected to the clutch 17 as indicated by a dotted line. With suction applied to the cylinder 27, the clutch 17 will be positively disengaged regardless of the engine speed. The clutch 17 comprises conventional means (not shown) for causing it to become engaged whenever the speed of the engine 18 exceeds a predetermined minimum speed sufficient to prevent stalling. Conversely, the clutch 17 becomes automatically disengaged whenever the speed of engine 18 drops below this minimum speed.

The general features of the system thus far described are shown in greater detail in my U.S. Patent No. 2,800,208, issued on July 23, 1957.

The intake manifold 30 is supplied with a fuel-air mixture by means of a carburetor 31 shown in greater detail in Figs. 2 to 4. The idling speed of the engine 18 may be increased from a low speed at which clutch 17 remains disengaged to a higher speed at which clutch 17 will remain engaged by the energization of a solenoid. This solenoid actuated mechanism for changing the idling speed is more fully described below in connection with Figs. 2 and 3.

The solenoid 33 is connected in an energizing circuit which extends from a grounded battery 34 and through ignition switch 36 to the solenoid 33. The solenoid energizing circuit is completed through conductor 35 which is connected to ground through a vehicle speed responsive switch 37. Thus, whenever the ignition switch 36 is turned on, the solenoid 33 is under control of the vehicle speed responsive switch 37. The vehicle speed responsive switch 37 is mechanically connected to the drive shaft 15 by gearing within the transmission 16. This is indicated in Fig. 1 by a dotted line and in Figs. 2 to 4 by showing the switch 37 mounted on the transmission 16. The contacts of the switch 37 are closed when the vehicle is standing still or moving slowly. When the vehicle reaches its lowest normal running speed, the switch 37 opens and remains open at higher speeds.

The carburetor 31 comprises the usual butterfly valve 39 controlled by a bell crank lever 40. The bell crank lever 40 is biased in a clockwise direction to close the butterfly valve 39 by a tension spring 42. A control rod 43 extends to the usual accelerator pedal (not shown) to open the valve 39.

With no pressure on the accelerator pedal the bell crank lever 40 is forced by the spring 42 into either of two idling positions in which the butterfly valve 39 is partially closed.

The core of the solenoid 33 is connected to a rod 45 which terminates at its free end in an enlarged abutment head 46. The rod 45 is surrounded by a helical compression spring 48 which urges the head 46 toward the left as viewed in Figs. 2 and 3. When solenoid 33 is energized, as with the vehicle standing still or moving at slow speed, the displaceable abutment head 46 is retracted. Under these conditions, the idling speed of the engine 18 is determined by an adjustable stop screw 49 which then engages fixed abutment 51 formed on the housing of the carburetor 31. With no pressure on the accelerator pedal, the bell crank lever 40 occupies the position shown in Fig. 2, in which the fuel consumption permitted by the carburetor butterfly valve 39 is at its minimum. The engine speed corresponding to the partially open valve position shown in Fig. 2 is such that the clutch 17 will always be disengaged.

With the vehicle moving and the contacts of the vehicle speed responsive switch 37 open, the solenoid 33 is deenergized and spring 48 displaces the movable abutment head 46 leftwardly to the position shown in Fig. 3. This produces a counterclockwise displacement of the idling position of position bell crank lever 40 by engagement between the head 46 and an adjustable stop screw 52. In this condition, the partially closed butterfly valve 39 is open to a greater extent than in Fig. 2 and the minimum idling speed of the engine is increased so that the clutch 17 will remain engaged at all times except when temporarily disengaged by suction cylinder 27 during gear shifting. In this manner the engine speed is constrained to remain high enough at all times to keep the clutch 17 engaged so that deenergization of the solenoid 33 effectively locks out the engine-speed responsive means for engagement and disengagement of the clutch 17. Under these conditions, with clutch 17 disengaged while shifting gears with the vehicle moving at normal driving speeds, at which time the engine 18 would otherwise be free to slow down to its clutch disconnecting idling speed in the absence of sufficient accelerator pedal pressure, the head 46 holds the butterfly valve 39 sufficiently open so that clutch engaging engine speed is positively maintained independently of the accelerator pedal.

In a modified embodiment of the invention shown in Fig. 4, provision is made to obtain the full braking action of the engine by shifting from the higher idling speed to the lower idling speed even though the vehicle is initially traveling at a normal driving speed.

As shown in Fig. 4 the foot brake pedal 54 is connected through a spring 55 to a switch 57. The switch 57 is provided with normally open contacts which close whenever pressure is applied to the brake pedal 54 for slowing down the vehicle. The switch 57 may be the usual stop light switch provided with additional separate contacts for controlling the solenoid 33. When pressure is applied to the brake pedal 54, the solenoid 33 is energized, thereby making the lower idling speed effective independently and regardless of the vehicle speed. In this way, the full engine drag is available until the vehicle slows down to a speed where the clutch 17 disengages. At such speed, the vehicle is moving slowly and the supplementary braking action of the engine drag is no longer required.

While we have shown what we believe to be the best embodiments of our invention, it will be apparent to those skilled in the art that changes and modifications may be made therein without departing from the spirit and scope of the invention as defined in the appended claims.

What is claimed is:

1. A propulsion system for a vehicle, comprising in combination: an engine; controllable means for varying the speed of said engine, said controllable means including selectively operable means for limiting said engine speed to first and second different minimum idling speeds, a speed responsive clutch connected to said engine, said clutch becoming engaged when said engine speed exceeds a predetermined engagement speed higher than said first idling speed and lower than said second idling speed, said clutch being disengaged when said engine speed is lower than said engagement speed, a transmission connected to said engine through said clutch, said transmission including a gear shift lever for changing gear ratios within said transmission; means connecting said transmission to propel said vehicle; first control means operatively associated with said gear shift lever, said first control means being actuated during gear shifting movement thereof; means controlled by actuation of said first control means for disengaging said clutch while said engine speed exceeds said clutch engagement speed; and second control means responsive to the road speed of said vehicle, said second control means being connected to said selectively operable means to limit said minimum engine speed to said first idling speed when said vehicle is moving at a slow road speed including stoppage thereof and to limit said engine speed to said second idling speed when said vehicle is traveling at speeds exceeding said slow speed.

2. In a vehicle propulsion system comprising an engine, a carburetor supplying fuel to said engine and having a controllable valve for varying the speed of said engine together with means yieldingly urging said valve toward a partially closed position for operating said engine at a first idling speed, a clutch connected to said engine, engine speed responsive means connected to cause selective engagement and disengagement of said clutch in response to variations in said engine speed, respectively, above and below a predetermined engine speed higher than said first idling speed, a transmission connected to said engine through said clutch, said transmission being connected to drive means for propelling said vehicle, said transmission including a gear shift lever for changing gear ratios within said transmission, circuit means actuated by said gear shift lever during gear shifting operation thereof for disengaging said clutch when said clutch would otherwise be engaged by said engine speed responsive means, the provision of vehicle road speed responsive means actuated when the vehicle speed exceeds a predetermined slow speed, and further circuit means controlled by said vehicle speed responsive means and connected to said carburetor for increasing the extent of said valve opening when said valve is in said partially closed position thereof to provide a second engine idling speed, said second idling speed being higher than said predetermined speed with respect to which said clutch engagement and disengagement occurs.

3. A propulsion system for a vehicle, comprising in combination: an engine; controllable means for varying the speed of said engine, said controllable means including selectively operable means for limiting said engine speed to first and second different minimum idling speeds, a speed responsive clutch connected to said engine, said clutch becoming engaged when said engine speed exceeds a predetermined engagement speed higher than said first idling speed and lower than said second idling speed, said clutch being disengaged when said engine speed is lower than said engagement speed, a transmission connected to said engine through said clutch, said transmission including a gear shift lever for changing gear ratios within said transmissions; means connecting said transmission to propel said vehicle; first control means operatively associated with said gear shift lever, said first control means being actuated during gear shifting movement thereof; means controlled by actuation of said first control means for disengaging said clutch while said engine speed exceeds said clutch engagement speed; second control means responsive to the speed of said vehicle, said second control means being connected to said selectively operable means to limit said minimum engine speed to said first idling speed when said vehicle is moving at slow speed including stoppage thereof and to limit said engine speed to said second idling speed when said vehicle is traveling at speeds exceeding said slow speed; a brake member for braking said vehicle, and third control means actuated by braking actuation of said brake member, said third control means being connected to said selectively operable means to limit said engine speed to said first idling speed upon braking actuation of said brake member independently of said second control means.

4. A propulsion system for a vehicle, comprising in combination: an engine; controllable means for varying the speed of said engine, said controllable means including selectively operable means for limiting said engine speed to first and second different minimum idling speeds; a speed responsive clutch connected to said engine, said clutch becoming engaged when said engine speed exceeds a predetermined engagement speed higher than said first idling speed and lower than said second idling speed, said clutch being disengaged when said engine speed is lower than said engagement speed; a transmission connected to said engine through said clutch, said transmission including a gear shift lever for changing gear ratios within said transmission; means connecting said transmission to propel said vehicle; first control means operatively associated with said gear shift lever, said first control means being actuated during gear shifting movement thereof; means controlled by actuation of said first control means for disengaging said clutch while said engine speed exceeds said clutch engagement speed; second control means responsive to the speed of said vehicle, said second control means being connected to said selectively operable means to limit said minimum engine speed to said first idling speed when said vehicle is moving at slow speed including stoppage thereof and to limit said engine speed to said second idling speed when said vehicle is traveling at speeds exceeding said slow speed; a brake pedal for braking said vehicle, and third control means connected to said selectively operable means along with said second control means, said third control means being connected for actuation by braking displacement of said brake pedal to render said first lower idling speed effective independently of said second control means and regardless of the speed of said vehicle.

5. In a vehicle propulsion system comprising an engine; a carburetor supplying fuel to said engine and having a controllable valve for varying the speed of said engine together with means yieldingly urging said valve toward a partially closed position for operating said engine at a first idling speed; a clutch connected to said engine; engine speed responsive means connected to cause selective engagement and disengagement of said clutch in response to variations in said engine speed, respectively, above and below a predetermined engine speed higher than said first idling speed; a transmission connected to said engine through said clutch, said transmission being connected to drive means for propelling said vehicle, said transmission including a gear shift lever for changing gear ratios within said transmission; circuit means actuated by said gear shift lever during gear shifting operation thereof for disengaging said clutch when said clutch would otherwise be engaged by said engine speed responsive means, the provision of vehicle speed responsive means actuated when the vehicle speed exceeds a predetermined slow speed; further circuit means controlled by said vehicle speed responsive means and connected to said carburetor for increasing the extent of said valve opening when said valve is in said partially closed position thereof to provide a second engine idling speed, said second idling speed being higher than said predetermined speed with respect to which said clutch engagement and disengagement occurs; a brake pedal for retarding said vehicle, and means actuable by braking operation of said pedal and included in said further circuit means, said last-named means rendering said circuit means ineffective to increase said valve opening independently of said vehicle speed responsive means.

6. A propulsion system according to claim 1, wherein said controllable means comprises an electromagnetic device having an energizing circuit for actuation of said selectively operable means and in which said second control means includes an electric switch connected in said energizing circuit.

References Cited in the file of this patent

UNITED STATES PATENTS

| | | | |
|---|---|---|---|
| Re. 20,824 | Maybach | | Aug. 9, 1938 |
| 2,134,520 | Kliesrath | | Oct. 25, 1938 |
| 2,739,678 | Parker | | Mar. 27, 1956 |
| 2,742,123 | Exline | | Apr. 17, 1956 |
| 2,742,987 | Mott et al. | | Apr. 24, 1956 |
| 2,747,848 | Kehoe | | May 29, 1956 |
| 2,766,862 | Binder | | Oct. 16, 1956 |
| 2,796,854 | Lazzereschi et al. | | June 25, 1957 |